Oct. 11, 1938.  S. N. JOHNSON  2,133,144
METHOD OF MANUFACTURING WHEELS
Filed June 28, 1935  2 Sheets-Sheet 1
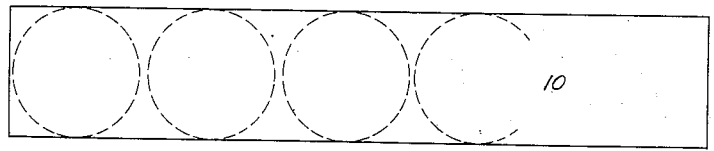
FIG. 1
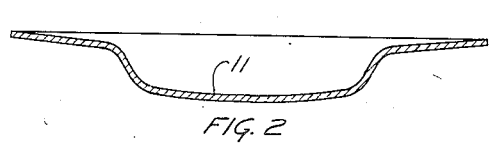
FIG. 2
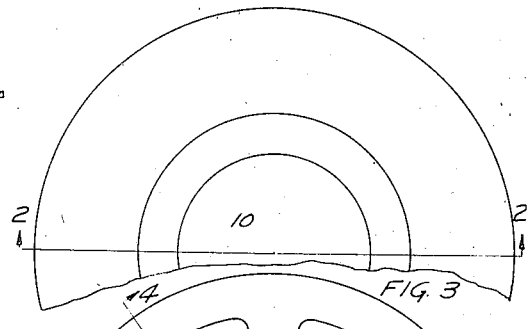
FIG. 3
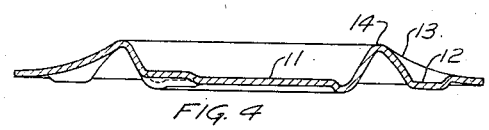
FIG. 4
FIG. 5
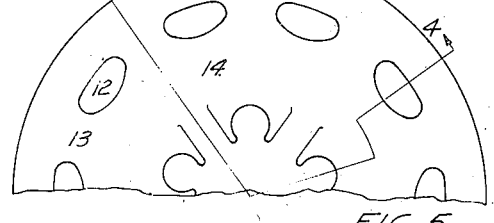
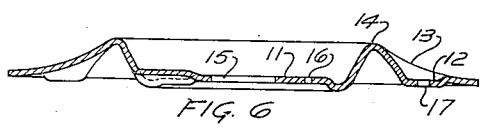
FIG. 6
FIG. 7
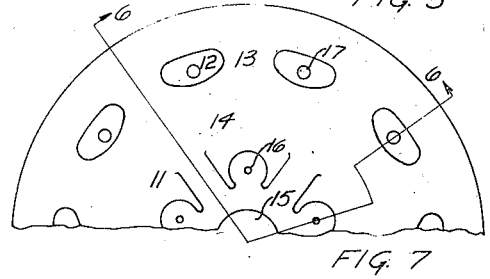
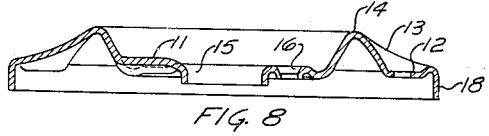
FIG. 8
FIG. 9
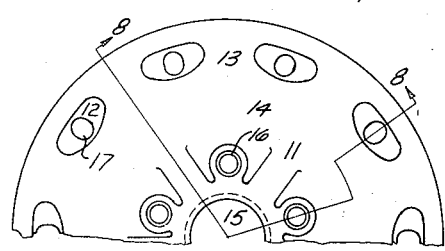
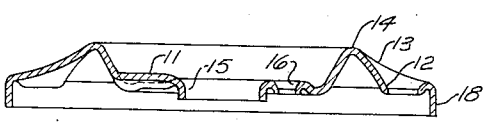
FIG. 10
INVENTOR.
STANLEY N. JOHNSON
BY
Carroll R. Taber
ATTORNEY.

Oct. 11, 1938.  S. N. JOHNSON  2,133,144

METHOD OF MANUFACTURING WHEELS

Filed June 28, 1935  2 Sheets-Sheet 2

INVENTOR.
STANLEY N. JOHNSON
BY
ATTORNEY.

Patented Oct. 11, 1938

2,133,144

UNITED STATES PATENT OFFICE 2,133,144

METHOD OF MANUFACTURING WHEELS

Stanley N. Johnson, Lansing, Mich., assignor to Motor Wheel Corporation, Lansing, Mich., a corporation of Michigan Application June 28, 1935, Serial No. 28,834

1 Claim. (Cl. 29—159.01)

This invention relates to the manufacture of vehicle wheels and more particularly to a novel method of forming one-piece metal wheel bodies.

The accompanying drawings illustrate a wheel made in accordance with the present invention and the various steps involved in producing the one-piece wheel body forming a part thereof.

Figures 1 to 10 inclusive show the various stages of development of the wheel body from strip stock to its finished form.

Figure 12:
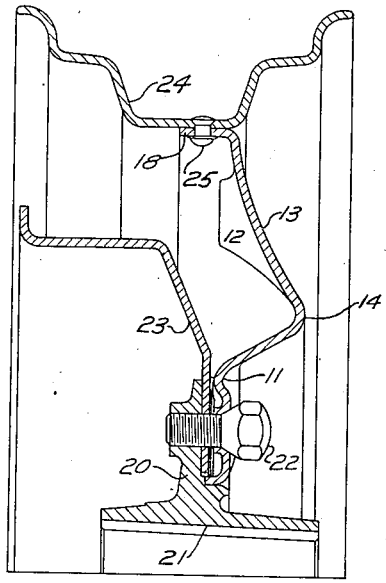
Figure 11:
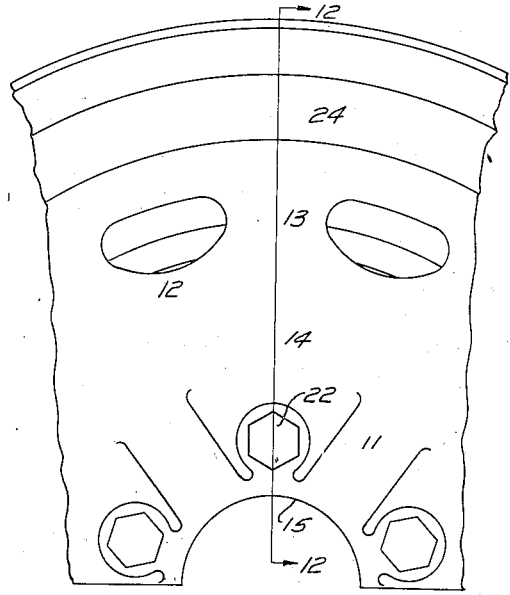

Figure 11 is a fragmentary front view in elevation of a vehicle wheel including the wheel body illustrated in Figure 10; and Figure 12 is a sectional view taken on substantially the line 12—12 of Figure 11.

One of the principal advantages of the present invention is its simplicity. The wheel body illustrated in Figures 10, 11 and 12 is formed from a strip of stock 10 shown in Figure 1 by a series of punching and deforming operations now to be described.

The strip 10 is divided into a plurality of circular blanks (see dotted circles Figure 1) by any suitable punching or cutting operation. Preferably at the same time the circular blank is punched from the strip 10, the central portion thereof is deformed by depressing it to the shape illustrated in Figure 2 to produce a bolting on flange 11 lying in a plane spaced from the original plane of the blank. Of course, if desired this deforming operation may be performed after the blank has been punched from the strip. The bolting on flange 11 of Figure 2 is not of course in finished form but is reshaped during the subsequent operations.

The radially outer zone of the blank is next subjected to a deforming operation whereby the same is pressed out of the original plane of the blank in the same direction as bolting on flange 11. This deforming operation, which may be accomplished by suitable dies, produces depressions 12 separated by the spoke-like formations 13 (see Figures 4 and 5). During this operation, as well as all subsequent operations, the annular zone indicated at 14 intermediate the bolting on flange and the radially outer portion of the blank is maintained in substantially the same plane as the original plane of the blank. This zone 14, in the finished wheel body, becomes the axially outermost portion of the wheel body. Simultaneously with the formation of depressions 12, or in a separate operation, if preferred, the bolting on flange 11 is reshaped as illustrated in Figures 4 and 5.

The blank illustrated in Figures 4 and 5 is next operated upon to produce the central hub opening 15 in the bolting on flange 11 (see Figures 6 and 7). Preferably at the same time the bolting on flange 11 is pierced as indicated at 16 to locate and produce in rough form the openings which subsequently in their finished form are adapted to receive the studs by means of which the wheel body is attached to a wheel hub. Likewise, at the same time small openings 17 are formed in the bottom wall of the depressions 12. These openings are provided in order to permit the deepening of the depressions 12 and the reshaping of such depressions as well as the spoke-like formations 13 without tearing the metal in the region of the depressions. All of the openings 15, 16 and 17 are preferably formed by a conventional piercing operation.

After the blank has been pierced as in Figures 6 and 7 to provide the openings 15, 16 and 17, it is next subjected to what may be termed reshaping and edge forming operations which produce the form illustrated in Figures 8 and 9. The reshaping operations consist in providing a drawneck for central opening 15 and stud opening 16 in bolting on flange 11, and deepening the depressions 12 while properly shaping the corners thereof. The extent of the reshaping of the depressions 12 is indicated in Figure 9 by the comparative size of the openings 17 in that figure with the corresponding openings in Figure 7. The edge forming operation consists in flanging the edge of the blank to produce the peripheral rim seat 18. This may be done by bending the metal over and ironing it out to produce a seat approximately at right angles to the original plane of the blank. The reshaping and edge forming operations just described are preferably performed simultaneously but obviously may be in the form of separate operations if desired.

After the reshaping and edge forming operation just described the entire bottom wall of each of the depressions 12 is removed by suitable punching or cutting operation (see Figures 10 and 11). Thereafter by suitable machining operations the wheel body is brought to accurate dimension and true concentricity. The wheel body in its finished form is shown in Figure 10.

The wheel body formed as just described may be mounted in a wheel structure as illustrated in Figures 11 and 12. As there shown, the wheel body is attached to the flange 20 of a hub 21 by means of cap screws 22 projecting through openings 16 in the bolting on flange 11. A brake drum 23 may be secured to the hub 21 between its flange 20 and the bolting on flange 11 of the wheel body.

As clearly shown in Figure 12 the annular rim seat 18 of the wheel body is adapted to receive a rim 24 which may be secured thereto by rivets 25.

From the foregoing description it will be apparent that this invention provides a simple and inexpensive method of forming a one-piece wheel body of artistic and sturdy design which may be readily and conveniently assembled with the other elements of an operative wheel structure. The scope of the invention is indicated in the appended claim.

I claim:

In the manufacture of wheels, the method of forming a one-piece wheel body from a circular blank of metal which comprises deforming the center of the blank to produce a bolting on flange, deforming the radially outer zone of the blank to produce spaced depressions separated by spoke-like formations, piercing the bottom wall of the depressions, deepening the depressions, and thereafter punching out the entire bottom wall of the depressions.

STANLEY N. JOHNSON.